United States Patent [19]

Walton

[11] Patent Number: 5,640,900
[45] Date of Patent: Jun. 24, 1997

[54] CARGO COMPACTING APPARATUS AND METHOD

[76] Inventor: Wayman E. Walton, 7355 Agate St., Rancho Cucamonga, Calif. 91730

[21] Appl. No.: 546,539

[22] Filed: Oct. 20, 1995

[51] Int. Cl.$^6$ .................. B30B 3/04; B30B 5/06
[52] U.S. Cl. ............ 100/35; 53/530; 100/151; 100/159; 100/170; 100/176; 414/788
[58] Field of Search ............ 100/35, 41, 155 R, 100/159, 151, 168, 170, 176; 198/456; 414/788, 907; 53/530

[56] References Cited

U.S. PATENT DOCUMENTS

| | | | |
|---|---|---|---|
| 2,893,186 | 7/1959 | Litty | 53/530 |
| 2,962,848 | 12/1960 | Wilson | 53/530 |
| 3,174,632 | 3/1965 | Eynon | 414/788 |
| 3,252,593 | 5/1966 | Eynon | 414/788 |
| 3,353,689 | 11/1967 | Dankelmeier et al. | 414/788 |
| 4,633,776 | 1/1987 | Blackmore et al. | 100/159 |

FOREIGN PATENT DOCUMENTS 2432738  1/1976  Germany ................. 414/907

*Primary Examiner*—Stephen F. Gerrity
*Attorney, Agent, or Firm*—Boniard I. Brown

[57] ABSTRACT

A cargo consisting of stacked compressible bales, such as bales of straw, positioned on a flat cargo bed of a cargo vehicle is compacted and compressed laterally of the cargo bed to eliminate excessive overhang of the cargo beyond the sides of the bed by pressing compacting members against opposite sides of the cargo to exert opposing compacting forces on the cargo laterally of the cargo bed. The disclosed compacting members are rollers between which the cargo vehicle is driven in a manner such that the rollers undergo relative rolling movement along the sides of the cargo to progressively compact the cargo from one end to the other.

21 Claims, 4 Drawing Sheets

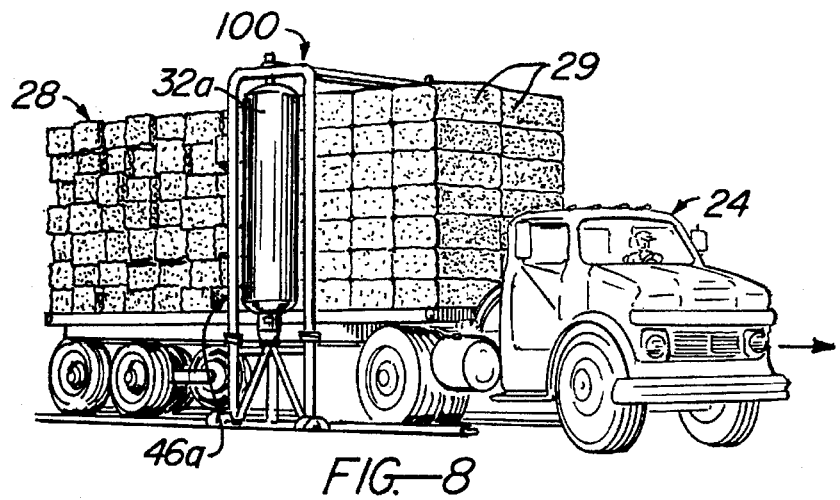
FIG.–8
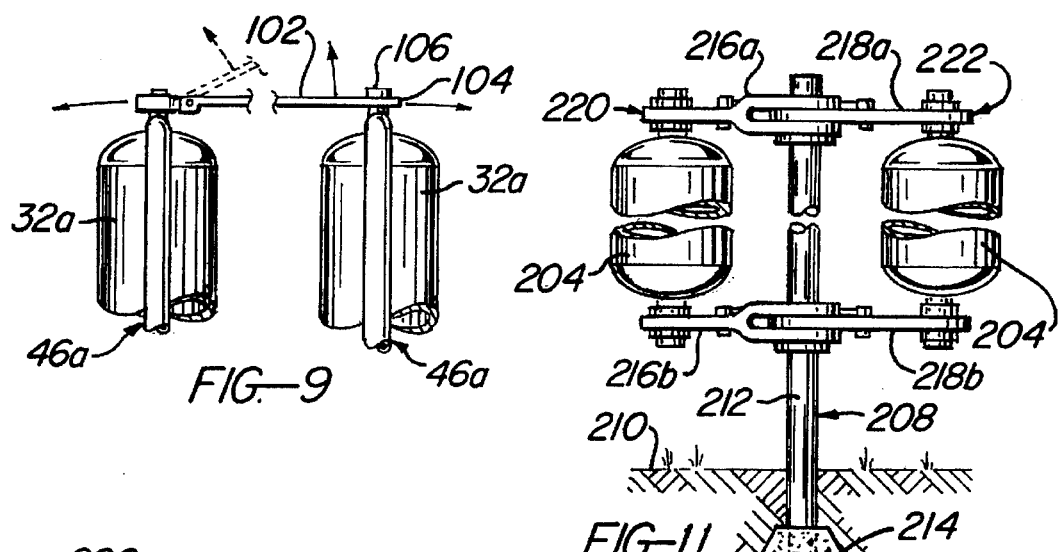
FIG.–9
FIG.–11
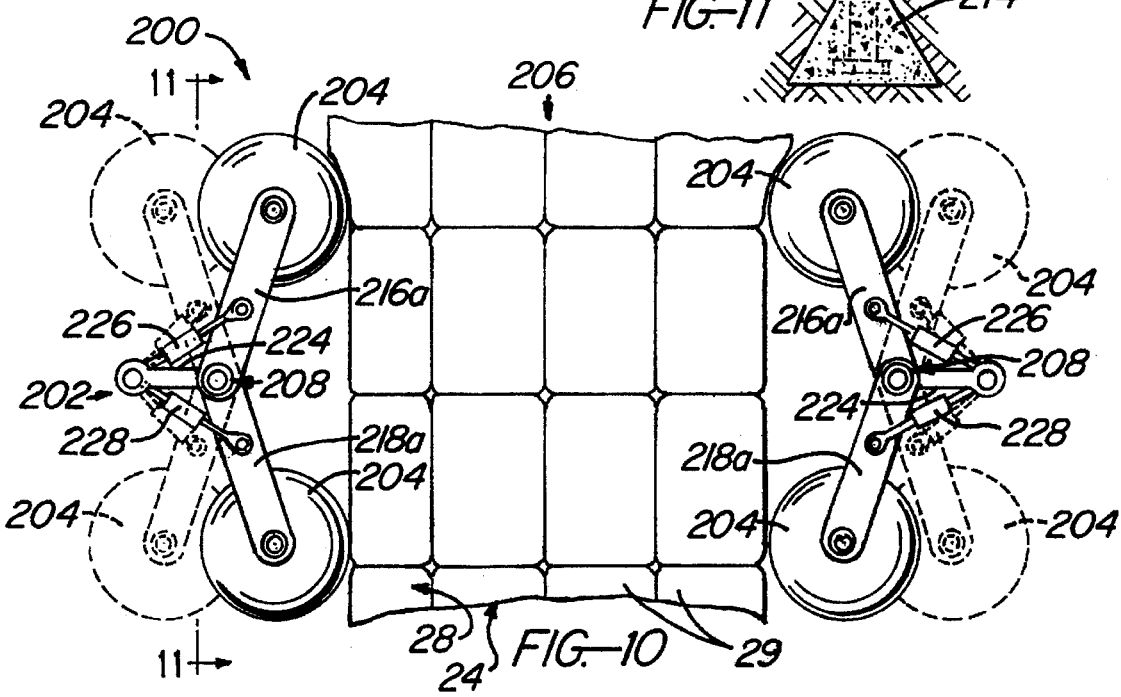
FIG.–10

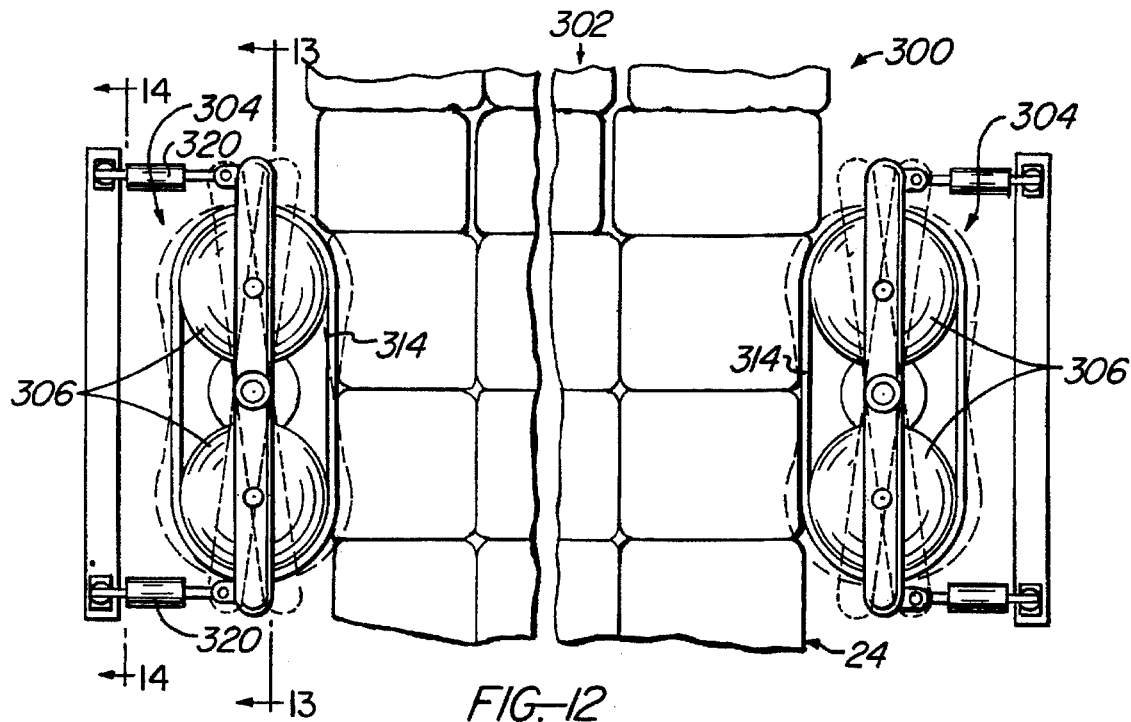
FIG.-12
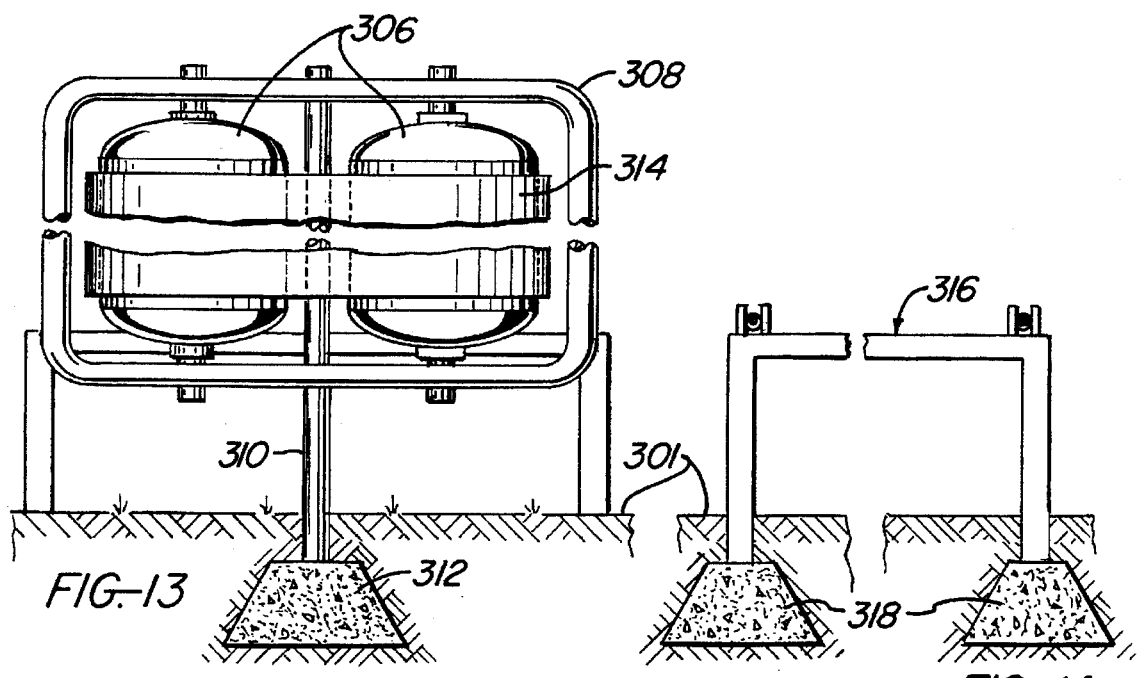
FIG.-13
FIG.-14
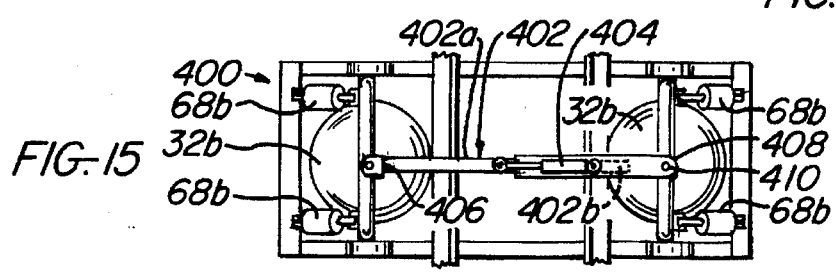
FIG.-15

CARGO COMPACTING APPARATUS AND METHOD

BACKGROUND OF THE INVENTION

1. Field of the Invention

This invention relates generally to the cargo handling art and more particularly to a cargo compacting method and apparatus for compacting a cargo laterally of a flat bed cargo hauling vehicle on which the cargo is positioned for the purpose of eliminating excessive projection or overhang of the cargo beyond sides of the cargo bed.

2. Discussion of the Prior Art

The primary intended use of the present invention is compacting a cargo consisting of stacked compressible bales of hay, straw, and the like positioned on a flat bed cargo hauling vehicle. For this reason, the invention will be described in this particular context. It will become evident as the description proceeds, however, that the invention conceivably may be used to advantage with other types of compressible cargo bales as well as other types of compactable cargoes. In the ensuing description, the term "straw" is used in a generic sense to mean any and all hay, straw and similar materials which are commonly handled and transported in bales for use as livestock fodder, as a covering for growing sod and other plants, and for other purposes.

Straw is commonly baled directly in the field immediately after harvesting. Each straw bale consists of a relatively compact mass of straw bound with a rope or wire. Mass transportation of such straw bales from one location to another is accomplished on flat bed cargo vehicles, such as large flat bed trucks or trucks having flat bed trailers. The straw bales are placed on the flat cargo bed of the cargo vehicle with the aid of a fork-lift to provide a straw bale cargo consisting of several layers of bales, for example seven layers, stacked one on top of the other. Each layer normally has approximately the same length and width as the cargo bed on which the bales are stacked.

One of the difficulties involved in stacking and transporting straw bales on a flat cargo bed is avoiding excessive projection or over-hang of the bales beyond the longitudinal sides of the cargo bed. The law establishes the permissible maximum projection or over-hang. A trucker hauling a cargo of straw bales which exceeds this maximum over-hang is subject to being stopped and issued a citation by the police and may be liable for the payment of a substantial fine or other penalty. Accordingly, when loading straw bales on a flat cargo bed, the loading forklift operator normally exercises some effort to place the bales in a manner which avoids excessive over-hang of the bales. This is difficult, time consuming, and hence costly to accomplish using only a fork-lift, however, with the result that many trucks on the highway have illegal loads.

BRIEF DESCRIPTION OF THE INVENTION

This invention provides a unique cargo compacting method and apparatus for compacting a compactable cargo positioned on a flat bed cargo vehicle, especially a cargo consisting of stacked compressible bales of straw or other material, for the purpose of locating the sides of the cargo in legally acceptable relation to the sides of the cargo bed. According to the present invention, this is accomplished by locating the cargo bed in cargo compacting relation between opposing cargo compactors or compacting members which exert on the cargo, laterally of the cargo bed, opposing compacting forces that squeeze the cargo laterally of the cargo bed in such a way as to locate the sides of the cargo in proper relation to the sides of the bed. These opposing compacting forces compact a cargo consisting of stacked bales of straw or other compressible material by compressing the bales and shifting the bales laterally of the cargo bed.

In the preferred compacting method and apparatus of the invention, the cargo vehicle moves along a normally horizontal path passing between the compacting members. The compacting members comprise cylindrical rollers which extend vertically the full height of the cargo and press inwardly against the cargo sides. The cargo vehicle moves along the path continuously during the entire compacting operation in such a way that the rollers undergo relative lateral rolling movement along the cargo sides from the front end to the rear end of the cargo and thereby compact the cargo progressively from its front end to its rear end.

Several presently preferred embodiments of the invention are described. In certain of these described embodiments, the compacting rollers are movable by actuators toward one another to extended compacting positions in which the rollers are disposed to exert opposing compacting forces on the cargo and away from one another to retracted positions in which the rollers release the cargo. In other described embodiments, the compacting rollers have essentially fixed positions laterally of the vehicle path.

Certain of the described embodiments have a base which rests on the ground and includes vehicle supporting means, such as tracks, which form the path along which cargo vehicles move through the apparatus. Located at opposite sides of this path are cargo compacting rollers having rotation axes located in planes transverse to the longitudinal direction of the path. These rollers are pivotally mounted on the base for pivotal movement toward one another to vertical cargo compacting positions and away from one another to retracted positions about pivot axes at the lower ends of the rollers parallel to the longitudinal direction of the vehicle path. The rollers are moved toward and away from one another by hydraulic actuators acting between the rollers and the base and/or between the upper ends of the rollers. The tracks or other vehicle supporting means act to guide the vehicle along the vehicle path to maintain the vehicle centered between the compacting rollers.

In other described embodiments of the invention, the vehicle path is provided by the ground surface, or by tracks laying on the ground. Pivotally mounted on separate supports rigidly anchored in the ground at opposite sides of the path are compacting rollers whose rotation axes are vertical. Each support mounts a plurality of rollers having vertical rotation axes. These rollers are pivotally movable by actuators, individually in one described embodiment and in unison but in opposite directions in another described embodiment, toward and away from the vehicle path about vertical pivot axes laterally offset from the vertical rotation axes of the respective rollers. In one of these described embodiments, each support mounts a pair of vertical rollers about which is trained a broad endless belt forming a movable tread-like member for engaging the cargo to be compacted.

BRIEF DESCRIPTION OF THE DRAWINGS

FIG. 8 is a perspective view of a modified compacting apparatus according to the invention during cargo compacting movement of a cargo vehicle through the apparatus with a cargo of baled straw;

FIG. 9 is a fragmentary view of the compacting apparatus in FIG. 8 showing a strut releasably joining the upper ends of the cargo compacting rollers;

FIG. 10 is a top plan view of a modified cargo compacting apparatus according to the invention;

FIG. 11 is a section taken on line 11—11 in FIG. 10;

FIG. 12 is a top plan view of a further modified cargo compacting apparatus according to the invention;

FIG. 13 is section taken on line 13—13 in FIG. 12;

FIG. 14 is a section taken on line 14—14 in FIG. 12; and

FIG. 15 is a top plan view of a further modified cargo compacting apparatus according to the invention.

DESCRIPTION OF THE PREFERRED EMBODIMENTS

Figure 1:
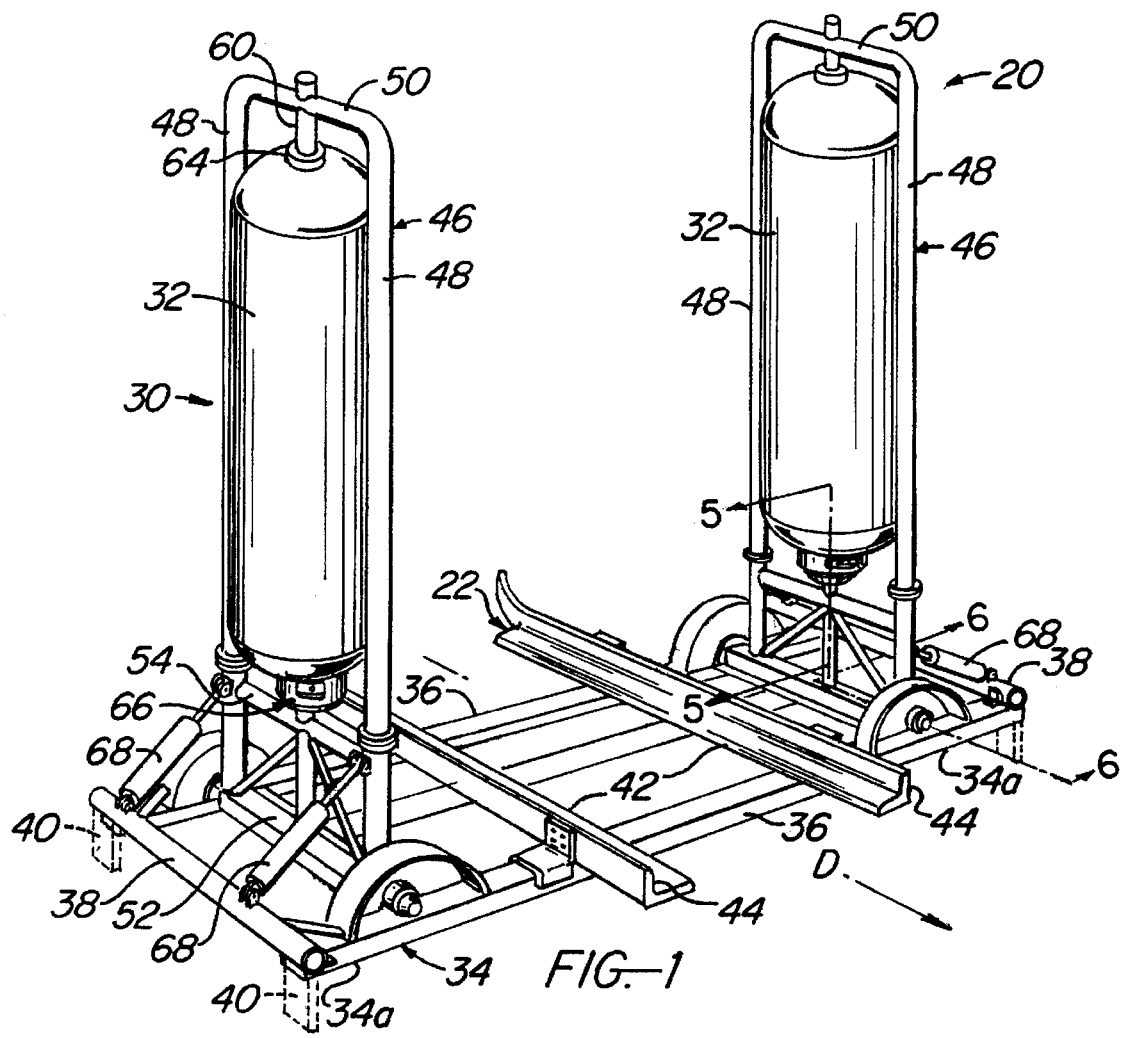
FIG. 1 is a perspective view of a cargo compacting apparatus according to the invention having cargo compacting members comprising rollers which are shown in their normal cargo compacting positions.
Figure 2:
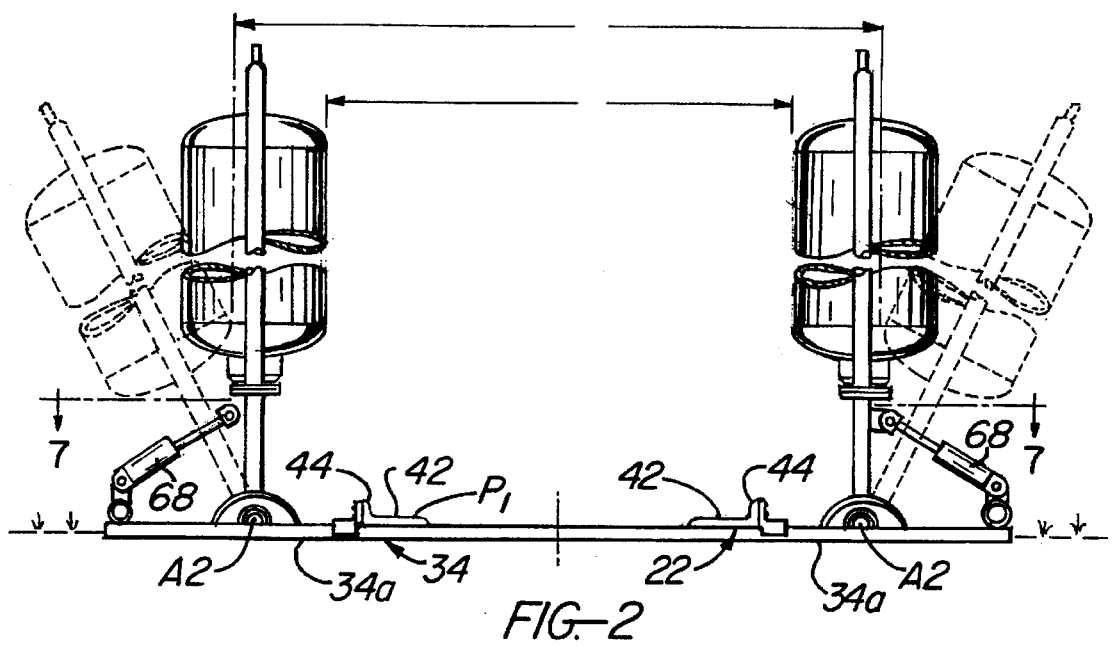
FIG. 2 is a side elevation of the cargo compacting apparatus in FIG. 1 showing, in full lines, the cargo compacting rollers in their cargo compacting positions and, in broken lines, the compacting rollers in retracted positions.

Turning now to these drawings and first to FIGS. 1–7, the illustrated cargo compacting apparatus 20 of the invention comprises means forming a vehicle path 22 located in a normally generally horizontal plane P1 and having a longitudinal direction D parallel to the path plane. A vehicle 24, such as a tractor trailer truck, having a flat cargo bed 26 supporting a cargo 28 to be compacted, in this case stacked bales 29 of straw, is movable along the path 22 to locate the cargo in cargo compacting relation to cargo compacting means 30 of the apparatus. As mentioned earlier, such bales are commonly loaded on a cargo bed in such a way that the laterally outer sides of the laterally outer bales in the load frequently project beyond or overhang the sides of the cargo bed a distance exceeding that permitted by law. Cargo compacting means 30 comprise cargo compactors or compacting members 32 which are located at laterally opposite sides of the path 22 and act to simultaneously exert opposing compacting forces F (FIG. 4) on the outer sides of the cargo 28 laterally of the cargo bed 26 while the cargo is positioned on the bed and in cargo compacting relation to the compacting means. These opposing compacting forces compress and shift the bales of straw laterally of the cargo bed 26 in such a way as to locate the laterally outer sides of the laterally outer cargo bales 29 in legally acceptable relation to the longitudinal sides of the cargo bed.

Referring now in more detail to the drawings, the illustrated cargo compacting apparatus 20 includes a base 34 to rest on the surface of the ground. Base 34 has a generally rectangular shape and includes a pair of parallel side members 36 extending laterally of the vehicle path 22 and rigidly joined at their ends by end members 38. Rigidly joined to and depending from the under sides of the end members 38 are anchors 40 to be driven into the ground to hold the base 34 in a fixed position on the ground. The vehicle supporting path defining means 22 of the apparatus comprise a pair of parallel tracks 42 extending transversely over the base members 36 parallel to the longitudinal direction D of the vehicle path 22 and rigidly secured to the base members 36. These tracks are spaced laterally to receive the wheels of the cargo vehicle 24 and have upstanding flanges or rails 44 which are engagable with the wheels to guide the vehicle along the path 22 and retain the vehicle in centered relation between the compacting members 32. The base 34 extends endwise beyond and has end portions 34a located at opposite sides of the vehicle path 22.

The compacting members 32 of the apparatus 20 comprise rigid cylindrical metal rollers having a length approximating the vertical height of the cargo 28 to be compacted. Rollers 32 have longitudinal rotation axes A1 located in a common plane P2 transverse to the longitudinal direction D of the vehicle path and are pivotally mounted on the end portions 34a of the base 34 for movement parallel to the plane P2 toward and away from one another on pivot axes A2 at the lower ends of the rollers parallel to the direction D. Each roller is rotatably supported in a generally rectangular frame 46 having normally upper and lower ends. This frame includes parallel longitudinal side members 48 rigidly joined at their upper ends by an upper cross member 50 and at their lower ends by lower cross members 52, 54.

Rigidly joined to and extending endwise from the ends of the lower cross members 52 of the roller frames 46 are coaxial bearing journals 56 (FIG. 6) which fit rotatably within bearing sleeves 58 mounted on the end portions 34a of the base 34, along the side members 36 of the base. The bearing sleeves 58 for each roller frame are coaxially aligned on the respective roller pivot axis A2. Each roller 32 is approximately centered between the side members 48 and end members 50, 54 of its respective frame 46 and is rotatably supported on the frame for rotation on the respective rotation axis A1 by coaxial shafts 60, 62 rigid on the upper and lower cross members 50, 54 of the frame extending through coaxial bearings 64, 66 on the upper and lower ends of the roller. The upper roller bearings 64 are radial bearings. The lower roller bearings 66 are combined radial and axial thrust bearings.

From the above description, it is evident that the frames 46 pivotally support the cargo compacting rollers 32 on the base end portions 34a for pivotal movement on their respective pivot axes A2 toward and away from one another laterally of the vehicle path 22 and rotatably support the rollers for rotation on their respective rotation axes A1. Connected between the roller frames 46 and the adjacent base end portions 34a are hydraulic actuators 68 for moving the roller frames and their compacting rollers 32 toward one another to their solid line vertical cargo compacting positions of FIG. 2 and away from one another to their broken line retracted positions of FIG. 2. The ends of these hydraulic actuators are connected by hydraulic fluid lines 69 (FIG. 7) to a hydraulic fluid source 70 comprising an internal combustion engine driven hydraulic pump 72 and valves (not shown) operated by a controller 74 for selectively supplying hydraulic fluid under pressure to either corresponding ends of the actuators through one of the fluid lines 69 and venting the other ends of the actuators through the other fluid line.

Figure 3:
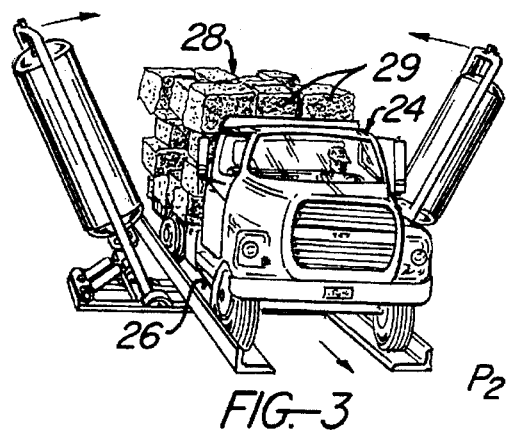
FIG. 3 is a perspective view, on reduced scale, of the cargo compacting apparatus in FIGS. 1 and 2 showing a cargo vehicle with a non-compacted cargo of stacked bales of straw entering the apparatus with its cargo compacting rollers in their retracted positions.
Figure 4:
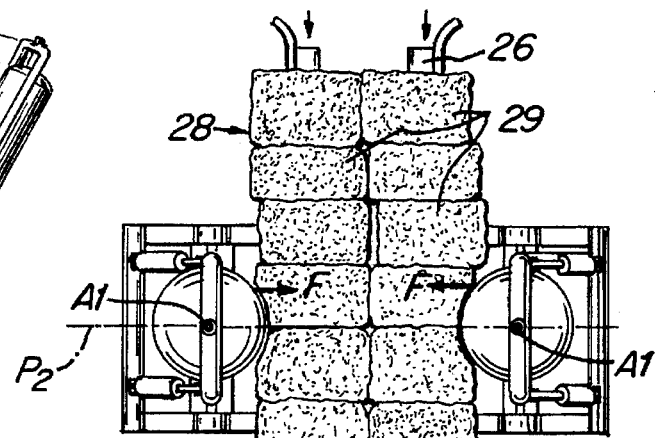
FIG. 4 is a top plan view on enlarged scale of the apparatus and cargo vehicle in FIG. 3 showing the vehicle moving forwardly through the apparatus with the compacting rollers extended to their compacting positions for compacting the baled cargo on the vehicle.
Figure 5:
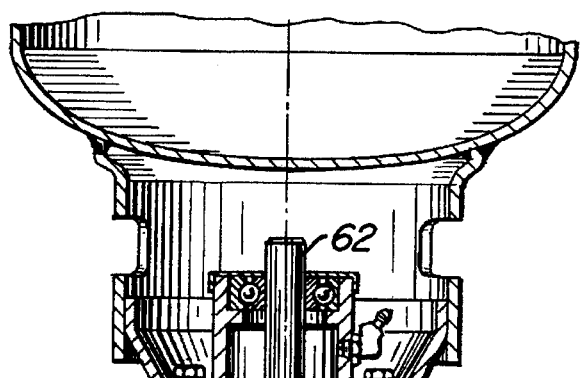
FIG. 5 is an enlarged section taken on line 5—5 in FIG. 1.
Figure 6:
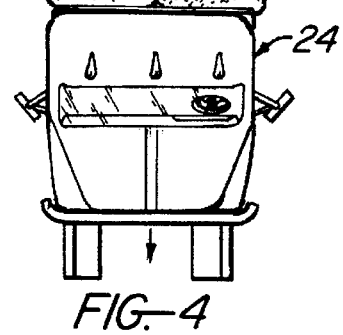
FIG. 6 is an enlarged section taken on line 6—6 in FIG. 1.
Figure 7:
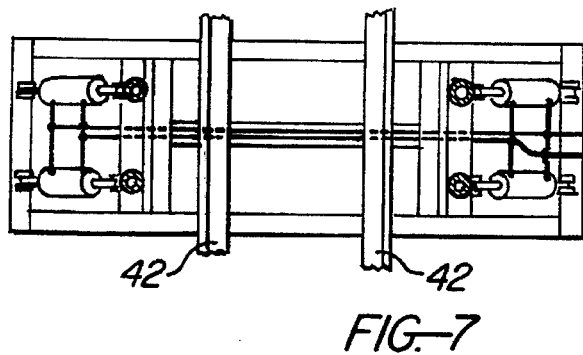
FIG. 7 is a semi-diagrammatic sectional view on reduced scale of the compacting apparatus of FIGS. 1–6, taken on line 7—7 in FIG. 2, illustrating a hydraulic system for supplying hydraulic operating fluid to hydraulic actuators of the compacting apparatus for extending and retracting the cargo compacting rollers of the apparatus.

The compacting apparatus 20 operates in the following manner. The compacting rollers 32 and their frames 46 are rotated away from one another to their retracted positions of FIG. 3 to accommodate driving of a cargo vehicle 24 into the apparatus along the vehicle path 22 and to an initial cargo compacting position along the path in which the front end of the baled cargo 28 on the vehicle is located opposite the retracted compacting rollers 32. The bales 29 of straw in the arriving cargo are more or less randomly positioned, as depicted in FIG. 3, with at least some of the laterally outermost bales projecting an illegal distance beyond the sides of the vehicle cargo bed 26. Upon arrival of the cargo vehicle in its initial compacting position, the actuators 68 are operated of pivot the compacting roller frames 46 and their compacting rollers 32 inwardly to their solid line compacting positions of FIGS. 2 and 4. The cargo vehicle 24 is then driven forwardly from the compacting apparatus along the vehicle path with the compacting rollers 32 firmly retained in their extended compacting positions. During this forward movement of the vehicle, the compacting rollers 32 undergo relative lateral rolling movement along the sides of the cargo 28, as depicted in FIG. 4.

The rollers are so vertically positioned, sized in length, and laterally spaced in their compacting positions that as the cargo vehicle moves forwardly between the rollers, they press inwardly against the sides of the adjacent stacks of cargo bales 29 laterally of the vehicle cargo bed 26, along the full height of the stacks from the bottoms of the stacks to their tops, and progressively along the cargo from its front end to its rear end. The rollers thereby exert opposing inward compacting forces on the stacked bales 29 which compress and shift the bales The hydraulic force applied to the rollers is made sufficient to compress and shift the stacked bales to an extent such that when the inward pressure of the rollers against the bales is removed by exiting of the cargo vehicle 24 from the compacting apparatus, any "spring back" of the compressed bales will not result in excessive overhang of the outermost bales beyond the sides of the vehicle cargo bed 26.

The modified cargo compacting apparatus 100 illustrated in FIGS. 8 and 9 is identical to the compacting apparatus 20 of FIGS. 1–7 except for the differences discussed below. For this reason, it is unnecessary to describe the modified apparatus in complete detail, and the described elements of the modified apparatus are designated by the same reference numerals, with the subscript a, as their corresponding parts in FIGS. 1–7. One difference between the compacting apparatus 20 and the modified apparatus 100 resides in the fact that the hydraulic actuators 68 of the apparatus 20 are omitted in the modified apparatus 100. Another difference between the two apparatus resides in the fact that the upper ends of the roller frames 46a of the compacting apparatus 100 are releasably joined by a releasable strut 102. This strut normally retains the compacting rollers 32a in their vertical compacting positions of FIGS. 8 and 9. The strut 102 is hinged at one end to the upper end of the left hand roller frame 46a in FIG. 9 and has a collar 104 at its other end which is removably engagable over a stud 106 on the upper end of the right hand roller frame 46a. The modified cargo compacting apparatus 100 is otherwise identical to that of FIGS. 1–7.

Normally, the two compacting rollers 32a remain fixed by the strut 102 in their vertical compacting positions of FIGS. 8 and 9. A cargo 28 of straw bales 29 on a cargo vehicle 24 is compacted by driving the vehicle between the fixed rollers, as shown in FIG. 8. During this movement of the vehicle between the fixed rollers, they compact the cargo in the same manner as described in connection with FIGS. 1–7.

The modified cargo compacting apparatus 200 of FIGS. 10 and 11 includes a pair 202 of vertical compacting rollers 204 at each side of a horizontal vehicle path 206 along which a cargo vehicle 24 containing a cargo 28 of stacked bales 29 of straw to be compacted may be driven in the longitudinal direction of the path. In this modified embodiment, the roller pairs 202 are pivotally mounted on separate upright supports 208 firmly anchored in the ground 210. The surface of the ground between the roller pairs 202 forms the vehicle path. If desired, tracks (not shown) like those in FIGS. 1–7 may be laid on or tracks may be formed in the ground surface for guiding the cargo vehicle 24 the apparatus in the manner explained earlier in connection with FIGS. 1–7.

Each roller support 208 comprises a vertical metal post firmly secured at its lower end to a concrete footing 214 embedded in the ground 210. Rotatably mounted at one end on each post at two different vertical positions along the post are a first pair of radial arms 216a, 216b and a second pair of arms 218a, 218b. These arms are rotatably supported on the post by radial and vertical thrust bearings (not shown) and are rotatable in horizontal planes about the vertical axes of their respective post 208. Positioned between the first pair of arms 216a, 216b is a first vertical cargo compacting roller 204 which is rotatably supported at its upper and lower ends on the outer ends of the arms 216a, 216b for rotation of the roller relative to the arms about a vertical rotation axis parallel to and laterally spaced from the pivot axis of the arms on the respective post 208. The arms 216a, 216b and the intervening roller 204 are rotatably joined in manner which permits rotation of the roller relative to the arms but prevents angular movement of the roller rotation axis relative to the arms, whereby the roller and arms form a first rigid generally horizontal U-shaped roller structure 220 which is rotatable about the respective supporting post. Positioned between the second pair of arms 218a, 218b is a second vertical cargo compacting roller 204 which is rotatably supported at its upper and lower ends on the outer ends of the arms 218a, 218b for rotation of the roller relative to the arms about a vertical rotation axis parallel to and laterally spaced from the pivot axis of the arms on the respective post 208. The arms 218a, 218b and the intervening roller 204 are also rotatably joined in manner which permits rotation of the roller relative to the arms but prevents angular movement of the roller rotation axis relative to the arms, whereby the latter roller and arms form a second rigid generally horizontal U-shaped roller structure 222 which is rotatable about the respective supporting post. The two roller structures 220, 222 on each support post 208 are vertically positioned on the post at the proper compacting elevation for the cargo vehicle 24 bearing the cargo 28 to be compacted and are angularly positioned so that the two respective rollers 204 are located at opposite sides of the post relative to the longitudinal direction of the vehicle path 206.

Connected between a radial arm 224 rigid on each post 208 and the roller support arm 216a on the post is a hydraulic actuator 226. Connected between the radial arm 224 on each post 208 and the roller support arm 218a on the post is a hydraulic actuator 226. Actuators 224, 226 are operable to independently move their respective compacting rollers 204 to their extended compacting positions and their retracted positions, as shown in solid and broken lines in FIG. 10. The actuators 224, 226 are operable by a hydraulic system, such as that shown in FIG. 7, to extend and retract the rollers.

The compacting apparatus 200 is used in much the same way as the compacting apparatus 20 of figures. A cargo vehicle 24 bearing a cargo 28 of stacked bales 29 of straw is driven along the vehicle path 206 with the compacting rollers 204 retracted and to an initial compacting position in which the compacting rollers 204 are located opposite the front end of the cargo. At this point, the rollers are extended by their actuators 226, 228 into compacting engagement with the sides of the cargo. The cargo vehicle 24 is then driven forwardly between the rollers to effect progressive lateral compression and shifting of the stacked bales 29 from the front end of the cargo to its rear end by relative rolling movement of the compacting rollers along the sides of the cargo. A unique advantage of the modified compacting apparatus 200 resides in the fact that the rollers 204 may be positioned so that planes tangent to the inner sides of the rollers, that is the roller sides facing the path 206, are inclined at a small angles relative to the longitudinal direction of the path in such a way that the spacing between trailing rollers at opposite sides of the path relative to the direction of relative movement of the rollers along the cargo (i.e. the lower rollers in FIG. 10) is slightly less than the spacing between the leading rollers. In this way, the two rollers of each roller pair 202 will produce progressive compression of the cargo.

The modified cargo compacting apparatus 300 of FIGS. 12–14 is similar to the apparatus 200 of FIGS. 10 and 11 in that apparatus 300 uses the surface of the ground 301 as a vehicle path 302 and embodies a pair 304 of vertical compacting rollers 306 at each side of the path. The two compacting rollers 306 of each roller pair 304 are rotatably mounted side by side within the opening through a rectangular frame 308 with the roller rotation axes parallel to one another. Each roller frame 308 is rotatably mounted on a separate support 310 in the form of a vertical post having its lower end secured to a concrete footing 312 embedded in the ground 301. The upper end of the post extends rotatably through the roller frame midway between and parallel to the rotation axes of the respective compacting rollers 306. Each roller frame 308 is vertically supported on its support post 310 by radial and vertical thrust bearings (not shown) at the proper compacting elevation for the cargo vehicle 24 bearing the cargo of straw bales 29 to be compacted. Trained about the two rollers 306 on each frame 308 is a wide endless belt 314 having a width approximating the length of the rollers.

Outwardly of each roller pair 304 is a support 316 firmly secured to concrete footings 318 embedded in the ground 301. Connected between each support and opposite sides of the adjacent roller frame 308 are a pair of hydraulic actuators 320. These actuators are selectively operable to pivotally position their respective roller frames 308 on the vertical axes of the frame supporting posts 310, as indicated by the solid and broken lines in FIG. 12.

The spacing, laterally of the vehicle path 302, between the opposing roller pairs 304, and more particularly between the roller belts 314, is essentially fixed, not adjustable as in the earlier described embodiments of the invention. This fixed spacing equals the spacing between the opposing compacting rollers of the earlier described embodiments in their extended compacting positions. In use of the modified cargo compacting apparatus 300, the belted compacting rollers 304 remain in their compacting positions of FIG. 12 at all times. The stacked straw bale cargo 28 on a cargo vehicle 24 is compacted by simply driving the vehicle along the vehicle path 302 between the rollers, as shown in FIG. 12. During this movement of the cargo vehicle between the rollers, the roller belts 314 press against the sides of the cargo and exert opposing compression forces on the stacked bales 29 in the cargo. These belts move endwise, somewhat in the manner of vehicle treads, across the cargo sides from the front end of the cargo to the rear end of the cargo, thereby progressively compacting the cargo in much the same manner as in the earlier embodiments of the invention. The roller frames 308 are angularly adjustable about their vertical pivot axes by the hydraulic actuators 320 to locate the facing sides of the roller belts 314 parallel to the cargo sides or at slight angles relative to the cargo sides for the same reason as discussed earlier in connection with the compacting roller adjustment in FIGS. 10 and 11.

The modified cargo compacting apparatus 400 of FIG. 15 is identical to the compacting apparatus 20 of FIGS. 1–7 except as noted below. For this reason, the described parts of the apparatus 400 which are common to the apparatus 20 are designated by the same reference numerals, with the suffix b, as their corresponding parts in apparatus 20. The only difference between the compacting apparatus 400 and the compacting apparatus 20 resides in a longitudinally extendable and retractable strut 402 connecting the upper ends of the compacting roller frames 46b of the apparatus 400. This strut includes longitudinally telescoping members 402a and 402b connected by a hydraulic actuator 404 for longitudinally extending and retracting the telescoping strut members to move the upper ends of the compacting rollers 32b toward and away from one another. The left end of the strut 402 in FIG. 15 is pivotally attached by a hinge 406 to the upper end of the left roller frame 46b. The right end of the strut has a collar 408 which fits removably over a stud 410 on the right roller frame 46b.

The modified compacting apparatus 400 is otherwise identical to and used in essentially the same way as the compacting apparatus 20 except that the strut 402 is extended by its actuator 404 during separation of the compacting rollers 32b to their retracted positions by their actuators 68b to accomodate entrance of a cargo vehicle to an inititial cargo compacting position between the rollers. Movement of the rollers 32b to their extended compacting positions is accomplished by operation of the roller actuators 68b to pivot the rollers inwardly and operation of the strut actuator 404 to retract the strut 402 endwise and thereby pull the upper ends of the rollers toward one another. The cargo vehicle is driven forwardly between the extended rollers to effect compacting of its cargo in the same manner as described in connection with FIGS. 1–7. Both the strut 402 and the strut 102 in FIG. 9 prevent spreading of the upper ends of the compacting rollers by the outward thrust of the cargo on the rollers.

The inventor claims:

1. Cargo compacting apparatus for compacting a cargo of yieldably compressible material positioned on a flat cargo bed of a wheeled cargo vehicle, wherein the cargo and cargo bed have longitudinal sides facing laterally of the bed and the cargo is compressible laterally of the bed to locate said cargo sides relative to said sides of the bed, said apparatus comprising:

means providing a vehicle path disposed in a path plane and having a longitudinal direction and a lateral direction and along which the cargo vehicle is movable in said longitudinal direction, and cargo compacting means including cargo compactor located laterally opposite one another at laterally opposite sides of the path between which said vehicle is movable along said path for simultaneously exerting opposing compression forces on the sides of the cargo laterally of the cargo bed during movement of the vehicle between said compactors, and means for maintaining a fixed relationship between said compactors and said path and a fixed spacing between said cargo compactors.

2. Cargo compacting apparatus according to claim 1 wherein:

said compacting means includes at least one of the following means (a), (b): (a) means for moving said compacting members toward and away from one another in said lateral direction of said path, (b) means for adjusting said fixed spacing.

3. Cargo compacting apparatus according to claim 1 wherein:

said cargo compactors comprise elongate cylindrical rollers having longitudinal rotation axes which are substantially normal to said path plane when said compactors are in said fixed relationship and located in a common plane transverse to said longitudinal direction of said path.

4. Cargo compacting apparatus according to claim 1 wherein:

each cargo compactor comprises a pair of parallel rollers having rotation axes which are substantially normal to said path plane when said compactors are in said fixed relationship, each roller of one compactor and a roller of the other compactor constitute a pair of corresponding rollers, and the rotation axes of each pair of corresponding rollers are located in a common plane transverse to said longitudinal direction of said path.

5. Cargo compacting apparatus according to claim 1 wherein:

each cargo compactor comprises a pair parallel rollers having rotation axes which are substantially normal to said path plane when said compactors are in said fixed relationship, each roller of one comparator and a roller of the other compactor constitute a pair of corresponding rollers and the rotation axes of each pair of corresponding rollers are located in a common plane transverse to said longitudinal direction of said path, and endless belt trained about the pair of rollers of the respective compactor.

6. Cargo compacting apparatus according to claim 1 wherein:

said means providing said vehicle path comprise tracks for receiving the wheels of a cargo vehicle to guide the cargo vehicle along said path and maintain the vehicle centered between said cargo compactors.

7. Cargo compacting apparatus according to claim 1 wherein:

said cargo compactors include footings embedded in the ground, and said means providing said vehicle path comprises a ground area between said compactors.

8. Cargo compacting apparatus for compacting a cargo of yieldably compressible material positioned on a flat cargo bed or a wheeled cargo vehicle, wherein the cargo and cargo bed have longitudinal sides facing laterally of the bed and the cargo is compactable laterally of the bed to locate said cargo sides relative said sides of the bed, said apparatus comprising:

means providing a vehicle path disposed in a path plane and having a longitudinal direction and a lateral direction and along which the cargo vehicle is movable in said longitudinal direction, compacting means comprising elongate cylindrical cargo compacting rollers located laterally opposite one another at laterally opposite sides of said path and having normally upper and lower ends and longitudinal rotation axes located in planes transverse to the longitudinal direction of said path, means mounting said rollers for lateral movement of the rollers at opposite sides of said path toward and away from one another to locate the rollers at opposite sides of said path in cargo compacting positions relative to one another, and means for releasably joining the rollers at opposite sides of said path when said rollers occupy said compacting positions to maintain a fixed spacing between the rollers.

9. Cargo compacting apparatus according to claim 8 wherein:

said rollers include a plurality of parallel rollers at each side each side of said path, and said cargo compacting means further comprises an endless band trained about the rollers at each side of said path.

10. Cargo compacting apparatus for compacting a cargo positioned on a flat cargo bed of a wheeled cargo vehicle, wherein the cargo and cargo bed have longitudinal sides facing laterally of the bed and the cargo is compactable laterally of the bed to locate said cargo sides relative said sides of the bed, said apparatus comprising:

means providing a vehicle path disposed in a certain normally generally horizontal path plane of said apparatus and having a longitudinal direction parallel to said plane along which the cargo vehicle is movable to locate its cargo bed in cargo compacting relation to said apparatus and a lateral direction parallel to said plane, cargo compacting means for simultaneously exerting opposing compacting forces on the sides of the cargo in said lateral direction of said path while the cargo bed is located in said cargo compacting relation to said compacting means, and wherein said compacting means comprise elongate cylindrical cargo compacting rollers located at laterally opposite sides of said path and having normally upper and lower ends and longitudinal rotation axes located in planes transverse to the longitudinal direction of said path, and means mounting said rollers for lateral movement of the roller at opposite sides of said path toward and away from one another to locate the rollers at opposite sides of said path in cargo compacting positions relative to one another, said means mounting said rollers for lateral movement comprise pivotal mounting means pivotally mounting each roller on a pivot axis at the lower end of the respective roller substantially parallel to said longitudinal direction of said path, and said apparatus includes actuator means for moving each roller about its respective pivot axis.

11. Cargo compacting apparatus according to claim 10 wherein:

said means mounting said rollers for lateral movement further comprises a base pivotally mounting said rollers on their respective pivot axes, said apparatus includes actuator means acting between said base and said rollers for pivoting said rollers on their respective pivot axis, and said means providing said vehicle path comprises vehicle supporting means on said base between said rollers.

12. Cargo compacting apparatus for compacting a cargo positioned on a flat cargo bed of a wheeled cargo vehicle, wherein the cargo and cargo bed have longitudinal sides facing laterally of the bed and the cargo is compactable laterally of the bed to locate said cargo sides relative said sides of the bed, said apparatus comprising:

means providing a vehicle path disposed in a certain normally generally horizontal that plane of said apparatus and having a longitudinal direction parallel to said plane along which the cargo vehicle is movable to locate its cargo bed in cargo compacting relation to said apparatus and a lateral direction parallel to said plane, cargo compacting means for simultaneously exerting opposing compacting forces on the sides of the cargo in said lateral direction of said path while the cargo bed is located in said cargo compacting relation to said compacting means, and wherein said compacting means comprise elongate cylindrical cargo compacting rollers located at laterally opposite sides of said path and having normally upper and lower ends and longitudinal rotation axes located in planes transverse to the longitudinal direction of said path, and means mounting said rollers for lateral movement of the rollers at opposite sides of said path toward and away from one another to locate the rollers at opposite sides of said path in cargo compacting positions relative to one another, said means mounting said rollers for lateral movement comprise pivotal mounting means pivotally mounting said rollers at each side of said path on a pivot axis normal to said path plane with the roller rotation axes parallel to and spaced laterally from the respective pivot axis, and said apparatus includes actuator means for moving said rollers about their respective pivot axes.

13. Cargo compacting apparatus according to claim 12 wherein:

said pivotal mounting means comprises a pair of upright supports at laterally opposite sides of said path having longitudinal axes normal to said path plane and comprising said pivot axes, and means pivotally mounting each roller on the support at the same side of said path as the respective roller for pivotal movement of the respective roller about the longitudinal axis of the respective support with the rotation axis of the respective roller spaced laterally from the longitudinal axis of the respective support.

14. Cargo compacting apparatus according to claim 13 wherein:

said rollers include a pair of rollers pivotally mounted on each support and located at opposite sides of said longitudinal axis of the respective support.

15. Cargo compacting apparatus according to claim 13 wherein:

said supports are anchored in the ground, and said means providing said vehicle path comprises a ground area between said supports.

16. Cargo compacting apparatus for compacting a cargo positioned on a flat cargo bed of a wheeled cargo vehicle, wherein the cargo and cargo bed have longitudinal sides facing laterally of the bed and the cargo is compactable laterally of the bed to locate said cargo sides relative said sides of the bed, said apparatus comprising:

means providing a vehicle path disposed in a certain normally generally horizontal path plane of said apparatus and having a longitudinal direction parallel to said plane along which the cargo vehicle is movable to locate its cargo bed in cargo compacting relation to said apparatus and a lateral direction parallel to said plane, cargo compacting means for simultaneously exerting opposing compacting forces on the sides of the cargo in said lateral direction of said path while the cargo bed is located in said cargo compacting relation to said compacting means, and wherein said compacting means comprise elongate cylindrical cargo compacting rollers located at laterally opposite sides of said path and having normally upper and lower ends and longitudinal rotation axes located in planes transverse to the longitudinal direction of said path, and means mounting said rollers for lateral movement of the rollers at opposite sides of said path toward and away from one another to locate the rollers at opposite sides of said path in cargo compacting positions relative to one another, said rollers include a plurality of parallel rollers at each side of said path, said roller mounting means comprises a frame at each side of said path, means rotatably mounting the rollers at each side of said path on the adjacent frame with the rollers on each frame disposed side by side with their rotation axes parallel to one another, end means mounting each frame for movement in a certain direction such that the rollers on the frame move in said lateral direction of said path with their rotation axes normal to said path plane, and said apparatus includes actuator means for moving each frame in said certain direction.

17. Cargo compacting apparatus according to claim 16 wherein:

there are a pair of rollers on each frame, and said means mounting each frame comprises pivotal mounting means pivotally mounting the respective frame on a pivot axis normal to said path plane and passing midway between the rollers on the respective frame.

18. A method of compacting a cargo of stacked compressible bales positioned on a flat cargo bed of a wheeled cargo vehicle, wherein the cargo and cargo bed have longitudinal sides facing laterally of the bed and the cargo is compactable laterally of the bed to locate said cargo sides relative said sides of the bed, said method comprising the steps of:

providing a pair of compacting members, effecting simultaneous pressure of said compacting members against said cargo sides while the cargo is on said cargo bed to exert opposing compacting forces on said cargo laterally of said cargo bed and locate the cargo sides in a certain relation to said cargo bed sides, and effecting relative movement of said compacting members and said vehicle in the endwise direction of said vehicle to effect relative movement of said compacting members endwise along said cargo during application of said opposing compacting forces to the cargo by said compacting members.

19. The compacting method of claim 18 wherein:

said step of affecting relative movement of said compacting members along said cargo comprises driving said vehicle between said members along a vehicle path, and said compacting members comprise rollers having rotation axes generally normal to said path.

20. In combination;

a cargo vehicle having a flat cargo bed, and a cargo of yieldably compressible material positioned on said bed, and wherein said cargo and said cargo bed have longitudinal sides facing laterally of the bed and said cargo is compressible laterally of the bed to locate said cargo sides relative said sides of the bed, means providing a vehicle path having a longitudinal direction and a lateral direction and along which the cargo vehicle is movable in said longitudinal direction, and cargo compacting means including cargo compactors located laterally opposite one another at laterally opposite sides of the path between which said vehicle is moveable along said path for simultaneously exerting opposing compression forces on the sides of the cargo laterally of the cargo bed during movement of the vehicle between said compactors, and means for maintaining a positively fixed spacing between said cargo compactors.

21. The combination of claim 20 wherein:

said compacting means includes at least one of the following means (a), (b): (a) means for moving said compacting members toward and away from one another in said lateral direction of said path, (b) means for adjusting said fixed spacing.

* * * * *